United States Patent [19]

Howells

[11] 3,972,400

[45] Aug. 3, 1976

[54] FRICTION DISC FOR CLUTCHES AND THE LIKE

[75] Inventor: Norman B. Howells, Peoria, Ill.

[73] Assignee: Caterpillar Tractor Co., Peoria, Ill.

[22] Filed: Aug. 9, 1974

[21] Appl. No.: 495,996

[52] U.S. Cl. ............................................ 192/107 R
[51] Int. Cl.² ........................................... F16D 13/60
[58] Field of Search ......... 192/107 R, 107 C, 113 B

[56] References Cited
UNITED STATES PATENTS

| | | | |
|---|---|---|---|
| 2,690,248 | 9/1954 | McDowall | 192/107 R X |
| 2,965,205 | 12/1960 | Winchell | 192/107 R X |
| 3,048,250 | 8/1962 | Kershner | 192/107 R |
| 3,063,531 | 11/1962 | Aschauer | 192/107 R |
| 3,073,424 | 1/1963 | Russell | 192/107 R X |

Primary Examiner—Benjamin W. Wyche
Assistant Examiner—Lance W. Chandler
Attorney, Agent, or Firm—Phillips, Moore, Weissenberger Lempio & Strabala

[57] ABSTRACT

An oil cooled friction disc for clutches and the like comprising a plate member having a substantially flat annular configuration with a friction facing disposed on each side thereof. Each of said faces has a plurality of straight grooves of substantially constant cross section extending from the inner part of said facing to the periphery thereof and formed to carry cooling oil therein. At least half of the grooves are angularly disposed from the radius intersecting the inlet end with the angle being from about 105° to about 115°, and the remainder of the grooves extend radially.

10 Claims, 4 Drawing Figures

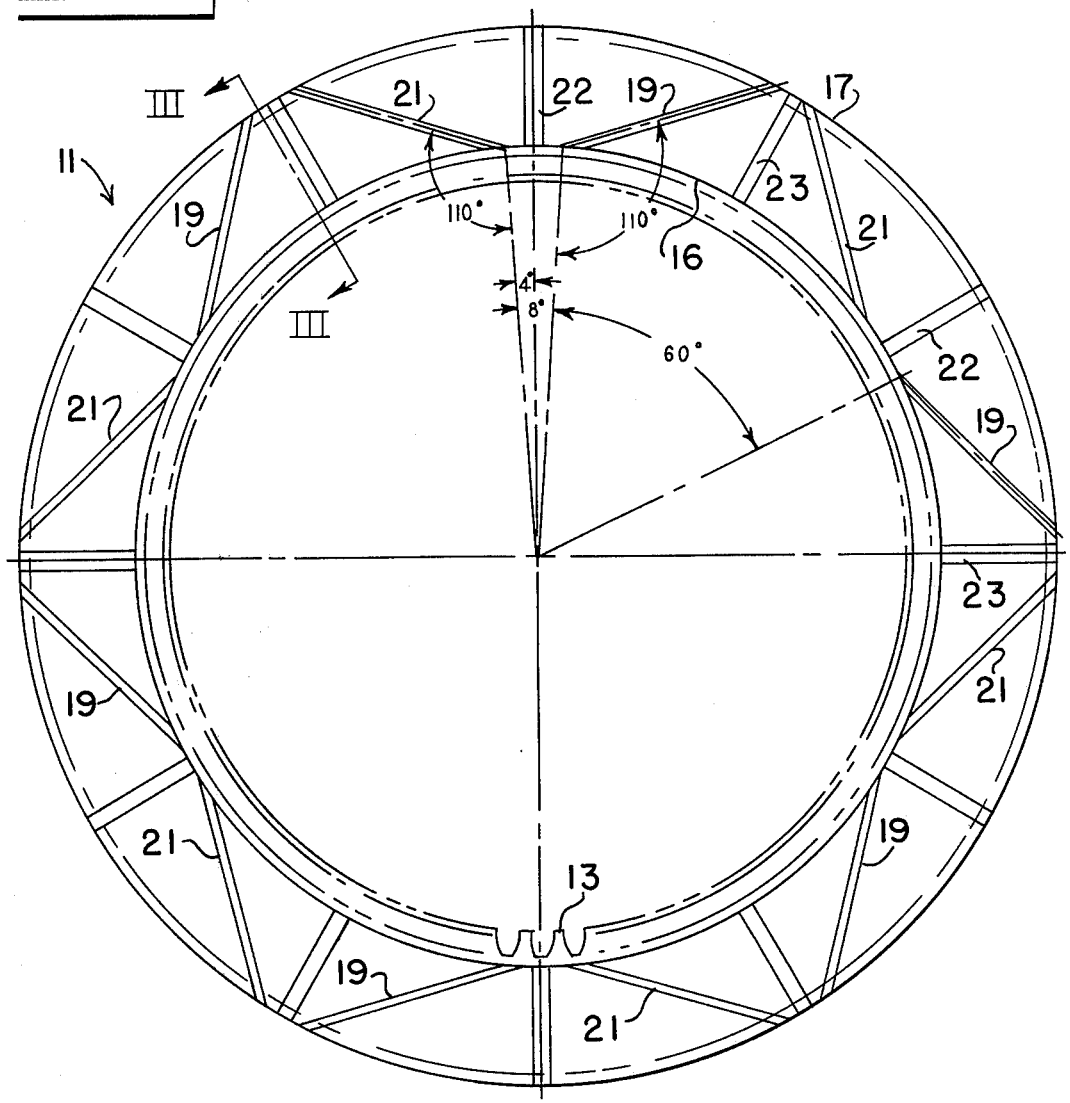
Fig-1-
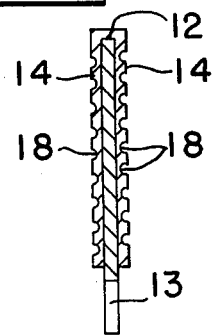
Fig-3-

FRICTION DISC FOR CLUTCHES AND THE LIKE

BACKGROUND OF THE INVENTION

The present invention relates to a friction disc for clutches and the like and more particularly to a friction disc having an improved configuration for reducing clutch drag losses.

It is well known that certain clutch discs, particularly those subjected to severe energy absorption levels, require cooling and lubrication during the engagement or disengagement of the clutch. This is particularly true of multi-disc clutches such as that shown in U.S. Pat. No. 2,690,248 to McDowall, issued Sept. 28, 1954. Considerable research effort has been expended in determining optimum configurations for clutch discs and lubrication systems therefor, as exemplified by U.S. Pat. Nos. 2,020,748; 2,556,809; 3,347,345; and 3,412,836. However, there is still room for additional improvement.

In general, two main factors are involved and these factors include the clutch drag losses for different disc groove patterns and cooling of the friction surfaces. Spiral and radial groove patterns for distributing cooling oil have been in use since the introduction of power shift transmission clutches and most of those used today have both types of grooves. Spiral groove patterns have the disadvantage of developing relatively high drag losses whereas discs with diamond or sunburst groove patterns operate at the lower drag levels. However, ineffective oil cooling shortens the life of friction materials that operate at high energy levels, and the grooving employed effects the cooling as well as the frictional drag losses. Since the transmission art is toward the use of higher speeds and loads, the discs employed must handle more energy, last longer, be more reliable, and in some cases require less space with reduced drag losses. Accordingly, the present invention is directed to a special disc configuration which effects an improvement in this area.

SUMMARY OF THE INVENTION

It is therefore a primary object of the invention to provide an improved friction disc for clutches and the like, in which a special groove configuration is provided for distributing, cooling and lubricating fluid such as oil therethrough in an improved manner whereby the drag loss characteristics are improved.

Another object of the invention is to provide an improved friction disc of the character described which has straight through grooves that may be easily and accurately fabricated by machining or other conventional processes.

In accordance with the invention, fluid carrying grooves are provided on the friction surfaces of the disc at controlled numbers and controlled angles with respect thereto, with the grooves all extending substantially straight through the entire facing and having a substantially uniform cross section. Such grooves may be accurately machined, and it has been found that grooves provide improved drag characteristics. The number of grooves which are utilized will vary in accordance with the size and configuration of the clutch disc. The criteria used for determining the number of grooves in a particular design include the following considerations: 1. The number and size of grooves required to do the job; 2. The number of grooves which will fit within a given disc size.

The configuration of the preferred clutch discs utilized herein are discs having a flat annular shape with each of the friction surfaces being defined as the flat area existing between two concentric circles. The variables include the overall size of the disc and the ratio of the two concentric circles.

In accordance with the invention, at least some of the straight-through grooves will be inclined angularly and should be disposed at an angle of say from about 100° to 120° from the radius of the internal circle at the inlet end of the groove, with the angle preferably being between about 105° and 115°. The overall groove configuration should be radially symmetrical and it is preferred to utilize similar radially disposed sectors in a number of from 6 to 12, with 6 and 12 being preferred forms. With smaller clutches, all of the grooves may be angularly disposed although it is preferred to include at least some radial grooves and with larger clutch discs, it is preferred to combine radially disposed grooves together with the angularly disposed grooves in a ratio of 1:1 or 2:1.

The relationship between the inner and outer concentric circle defining the fricton surface will be such that the angularly disposed grooves do not cross where the symmetry is in 6 sections and where they cross once where the symmetry is in 12 sections. When radial grooves are added, the number of radial grooves will preferably be from about 3 to 24, with the number of angularly disposed grooves being about 6 to 12 inclusive.

Further advantages and features of the invention will become more clearly understood with reference to the specific embodiments described in detail below.

BRIEF DESCRIPTION OF THE DRAWINGS

The preferred forms of the invention are illustrated in the accompanying drawings forming a part of this description in which:

FIG. 1 is a diagrammatic, plan view illustrating a preferred form of the invention;

FIG. 3 is a sectional view of the disc of FIG. 1 taken substantially in the plane of line 3—3 of FIG. 1.

Figure 2:
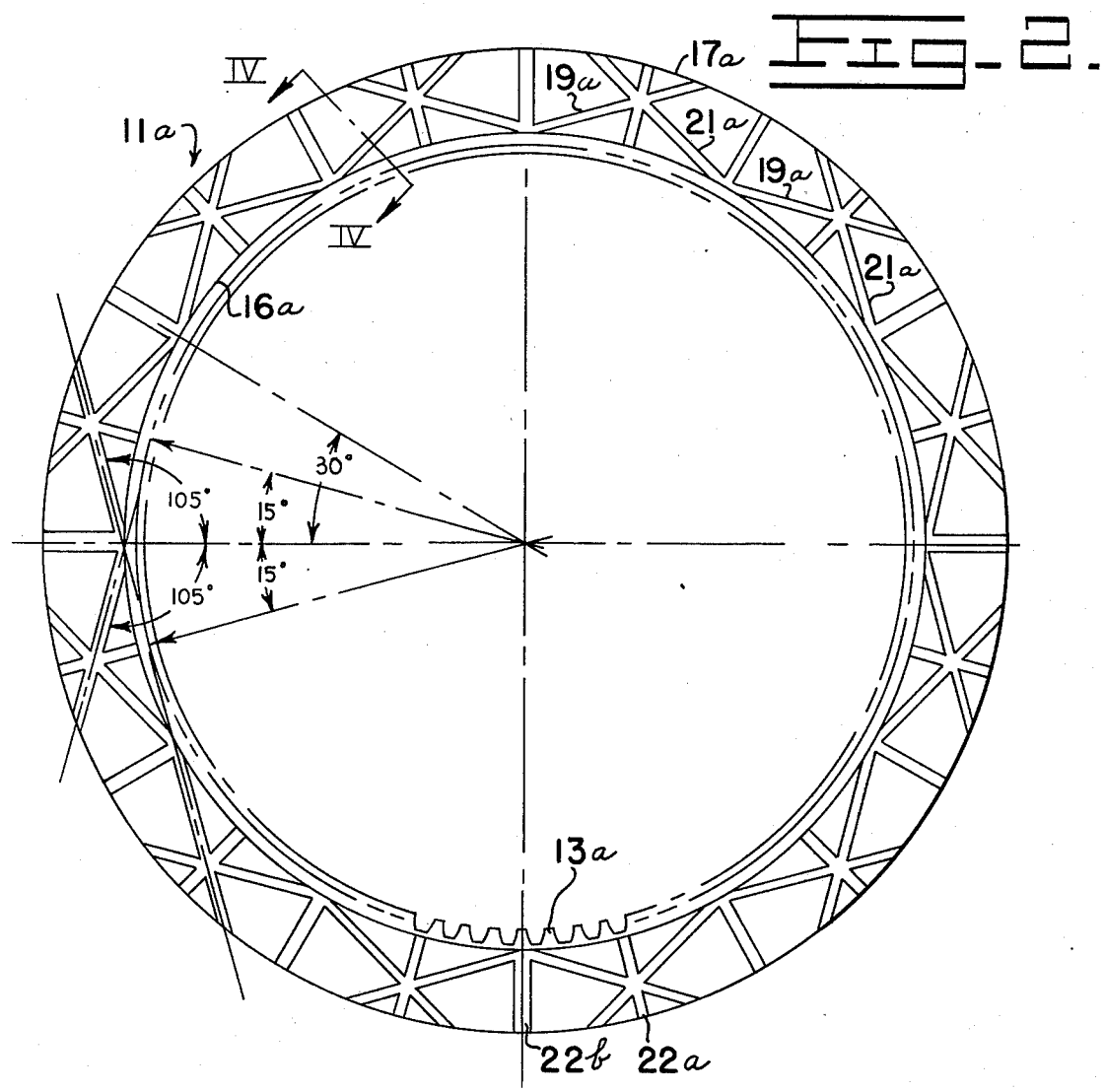
FIG. 2 is a diagrammatic, plan view illustrating an alternate form of the invention.
Figure 4:
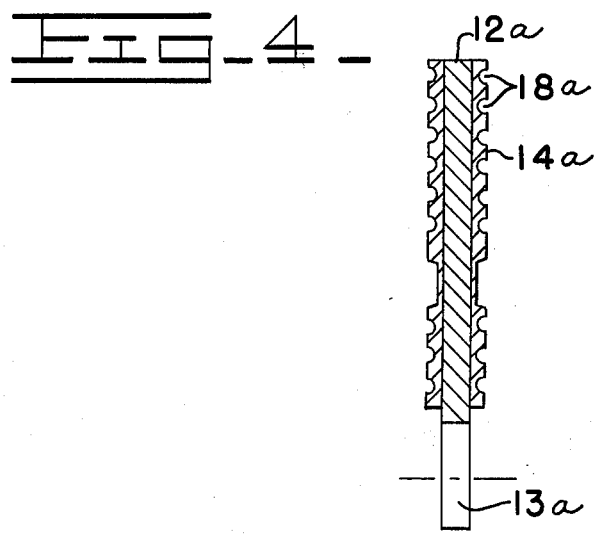
FIG. 4 is a sectional view of the disc of FIG. 2 substantially in the plane of line 4—4 of FIG. 2.

While only the preferred forms of the invention are shown, it should be understood that various changes or modifications may be made within the scope of the claims attached hereto without departing from the spirit of the invention.

DETAILED DESCRIPTION OF THE PREFERRED EMBODIMENTS

Referring more particularly to FIG. 1, there is shown a clutch disc 11 adapted to be utilized with additional clutch discs interleaved in the usual manner in multi-plate clutches. The clutch disc 11 comprises a flat, annular plate 12 having spline teeth 13 on the inner circumference thereof, and a friction facing 14 attached on each side thereof as best seen in FIG. 3. The spline teeth 13 are adapted to engage with splines formed on a drum (not shown) and rotates with the drum of an associated power train. It will be appreciated that the teeth can be on either the inner circumference or the outer circumference and can be lugs or other coupled drive means instead of teeth.

Each friction face 14 is generally made of sintered bronze, Teflon (Gylon), a paper type, or any other common friction material suitable for friction clutches. The facing is generally defined between an inner facing circle 16 and an outer facing circle 17, and is formed with a small, single, spiral, facing groove 18 on the face 14 thereof.

Each friction face 14 of clutch disc 11 is also provided with a plurality of large grooves or channels adapted to carry oil or like fluid between the interior and exterior of the clutch disc. As here shown, each facing has 6 right hand channel grooves 19 and 6 left hand channel grooves 21 each having a 20° entrance angle from the inner circumference 16 of the facing. In other words, each groove is disposed at an angle of 120° from the radius of the circle at its inlet end. As will also be noted in this embodiment, the grooves are spaced so as not to intersect. In addition, the inlet ends of adjacent grooves are spaced approximately 8° apart and the outlet ends are similarly spaced approximately 8° apart.

In operation, the clutch group includes a number of rotating grooved discs alternately separated by stationary, plain reaction plates. Cooling oil supplied at the clutch inside diameter enters and follows the grooves 19 and 21 through the disc facings and then discharges from the outer circumference 17. Right hand and left hand grooves accommodate disc rotation in either direction, and the groove inclination angle is selected for minimum resistance to the outward flow of oil with the disc rotating.

An added feature of this embodiment resides in the fact that the grooves can be easily machined on the clutch disc. By indexing the plate and machining the left and right hand grooves, all grooves can be readily machined on the disc. In this way, accurately located grooves having a substantially constant cross section may be provided with rapidity on ordinary production machinery.

It will be noted that the embodiment of FIG. 1 also includes 6 radial grooves 22 which are provided near and between the juxtaposed entrances of grooves 19 and 21, and 6 more radial grooves 23 between the juxtaposed exit ends of the grooves 19 and 21. Laboratory tests have shown that the addition of the radial grooves improves cooling oil distribution across the disc face and extends the life of the clutch disc. The number of radial grooves utilized will depend on the size of the clutch disc, and with clutch discs smaller than about a 12 inch diameter size, only the 6 radial grooves 22 are preferred, and the other radial grooves 23 omitted. With sizes greater than 12 inches, both the radial grooves 22 and 23 are preferably included. It will be appreciated that these radial grooves are also easily machined and that they too are provided with substantially uniform cross sections throughout.

Referring now more particularly to FIG. 2, there is shown an alternate form of clutch disc 11a comprising a plate 12a, spline teeth 13a, and friction faces 14a as in the embodiment of FIG. 1. In addition, the friction facings 14a are comprised of usual material used for friction facing, and has a single spiral facing groove 18a thereon. This facing surface is defined by an inner circumference 16a and outer circumference 17a.

Clutch disc 11a (FIG. 2) also comprises a plurality of right hand grooves 19a and left hand grooves 21a outwardly inclined at a slight angle from the radius. Specifically, the angle of these grooves is shown at 105° from the radius of the disc the inlet ends thereof. Instead of six right hand and six left hand grooves, however, 12 right hand and 12 left hand grooves are provided and these grooves intersect each other once and form an X configuration. Also, 12 radially extending grooves 22a preferred are provided that intersect at the intersections of the angular grooves 19a and 21a. Additional optional radial grooves 22b can be provided shown in FIG. 2 between the juxtaposed to the inlet ends of grooves 19a and 21a.

From the foregoing description, it is seen that an improved friction disc is provided by a disc face configuration having a plurality of outwardly inclined grooves extending in both the right hand and left hand directions, with the grooves extending straight through with a substantially constant cross section for a relatively uniform, even cooling effect throughout the length thereof. It is also seen that a clutch facing which combines the inclined grooves with radially extending the grooves provides an excellent facing having reduced drag characteristics and an improved useful wear life.

What is claimed is:

1. An improved friction disc for clutches and the like, comprising a (circumferentially uninterrupted) plate member formed in a substantially flat annular configuration having a (circumferentially uninterrupted) friction facing on a side thereof, and a plurality of straight angular grooves formed in said facing adapted to carry cooling fluid therein, each of said angular grooves being angularly disposed at an identical angle of from about 100° to about 120° relative to a radius of said disc intersecting an inlet end of such groove, a plurality of radially disposed grooves formed in said facing and disposed circumferentially thereabout, the number of radial grooves is equal to the number of angular grooves and wherein each of said radial grooves is disposed between each pair of circumferentially adjacent angular grooves.

2. An improved friction disc as defined in claim 1, in which the angular grooves are disposed symmetrically circumferentially on said facing.

3. An improved friction disc as defined in claim 2 in which the facing is divided into twelve similar sectors each having a pair of said angular grooves formed therein to converge radially outwardly towards each other into intersecting relationship.

4. An improved friction disc as defined in claim 2, in which the facing is divided into six similar sectors each having a pair of said angular grooves formed therein to converge radially outwardly towards each other in non-intersecting relationship.

5. An improved friction disc as defined in claim 1, in which each of the angular grooves is formed with a substantially even cross sectional area throughout its entire length.

6. An improved friction disc as defined in claim 1, in which the angular and radial grooves are disposed so that not more than three such grooves are intersected by any radius of the disc and wherein each radial groove intersects a respective pair of circumferentially adjacent angular grooves.

7. An improved friction disc as defined in claim 1, in which the grooves are disposed so that not more than one groove is intersected by any radius of the disc and wherein each of said radial grooves is disposed in non-intersecting relationship relative to any of said angular grooves.

8. An improved friction disc for clutches and the like, comprising a plate member formed in a substantially flat and uninterrupted annular configuration with a (circumferentially uninterrupted) friction facing disposed on each side thereof, each of said facings having a plurality of straight grooves of substantially constant cross section extending from the inner part of said facing to the periphery thereof and formed to carry cooling fluid therein, at least half of said grooves being angularly disposed from the radius intersecting its inlet end at an angle of from about 105° to 115°. and the remainder of said grooves extending radially outwardly between a respective pair of said angularly disposed grooves, in which twelve radially disposed grooves and twelve angularly disposed grooves are formed on said face in non-intersecting relationship with respect to each other.

9. An improved friction disc as defined in claim 8, in which twelve radially disposed grooves and twelve angularly disposed grooves are formed on said face in non-intersecting relationship with respect to each other.

10. An improved friction disc as defined in claim 8, in which each of the angularly disposed grooves is disposed at about 110° from a radius intersecting its inlet end.

* * * * *

UNITED STATES PATENT AND TRADEMARK OFFICE
CERTIFICATE OF CORRECTION

PATENT NO. : 3,972,400
DATED : August 3, 1976
INVENTOR(S) : NORMAN B. HOWELLS

It is certified that error appears in the above-identified patent and that said Letters Patent are hereby corrected as shown below:

Column 4, claim 1, line 2, delete "(circumferentially uninterrupted)";

line 4, delete "(circumferentially uninterrupted)".

Column 5, claim 8, line 4, delete "(circumferentially uninterrupted)".

Signed and Sealed this

Fifth Day of April 1977

[SEAL]

Attest:

RUTH C. MASON
Attesting Officer

C. MARSHALL DANN
Commissioner of Patents and Trademarks